United States Patent
Kumar

(10) Patent No.: US 9,920,505 B2
(45) Date of Patent: Mar. 20, 2018

(54) CONFINED HYPERSONIC EVAPROTRANSPIRATION CHAMBER AND A METHOD OF EXTRACTION OF WATER

(71) Applicant: Rajah Vijay Kumar, Bangalore (IN)

(72) Inventor: Rajah Vijay Kumar, Bangalore (IN)

( * ) Notice: Subject to any disclaimer, the term of this patent is extended or adjusted under 35 U.S.C. 154(b) by 0 days.

(21) Appl. No.: 15/517,542

(22) PCT Filed: Oct. 10, 2014

(86) PCT No.: PCT/IN2014/000649
§ 371 (c)(1),
(2) Date: Apr. 7, 2017

(87) PCT Pub. No.: WO2016/056018
PCT Pub. Date: Apr. 14, 2016

(65) Prior Publication Data
US 2017/0254053 A1    Sep. 7, 2017

(51) Int. Cl.
*E03B 3/28* (2006.01)
*B01D 53/26* (2006.01)

(52) U.S. Cl.
CPC .............. *E03B 3/28* (2013.01); *B01D 53/265* (2013.01)

(58) Field of Classification Search
CPC ......... E03B 3/28; B01D 53/265; F24F 3/1603
See application file for complete search history.

(56) References Cited

U.S. PATENT DOCUMENTS

| 1,931,347 | A | 10/1933 | Gay |
| 2,409,624 | A | 10/1946 | Bernard |
| 3,675,442 | A | 7/1972 | Swanson |
| 5,810,249 | A | 9/1998 | Nilsson |
| 2005/0284167 | A1 | 12/2005 | Morgan |
| 2010/0071388 | A1* | 3/2010 | Koshiyama .......... B01D 53/265 62/85 |
| 2012/0073320 | A1* | 3/2012 | Seoane ................ B01D 5/0006 62/291 |
| 2013/0098080 | A1* | 4/2013 | Biancardi ................. E03B 3/28 62/93 |

OTHER PUBLICATIONS

WIPO, International Search Report (on priority PCT application), dated Mar. 16, 2015.

* cited by examiner

*Primary Examiner* — Cassey D Bauer
(74) *Attorney, Agent, or Firm* — Laurence P. Colton; Smith Tempel Blaha LLC

(57) ABSTRACT

The present invention illustrates a Confined Hypersonic Evapotranspiration (COHET) Chamber and a method of extraction of water from the Earth's atmosphere, air or other gases, using a technique called Confined Hypersonic Evaprotranspiration inside a closed chamber. It is used to extract extremely low atmospheric water, typically as low as 10 ppm (10 parts per million). Application includes extraction of water from the atmosphere, air or any other gas for the purpose of, for example, drinking and agriculture, quick analysis of pollutants in the lower and upper atmosphere, to study rain formation in confined space, and evaprotranspiration process in nature.

10 Claims, 2 Drawing Sheets

Figure 1:
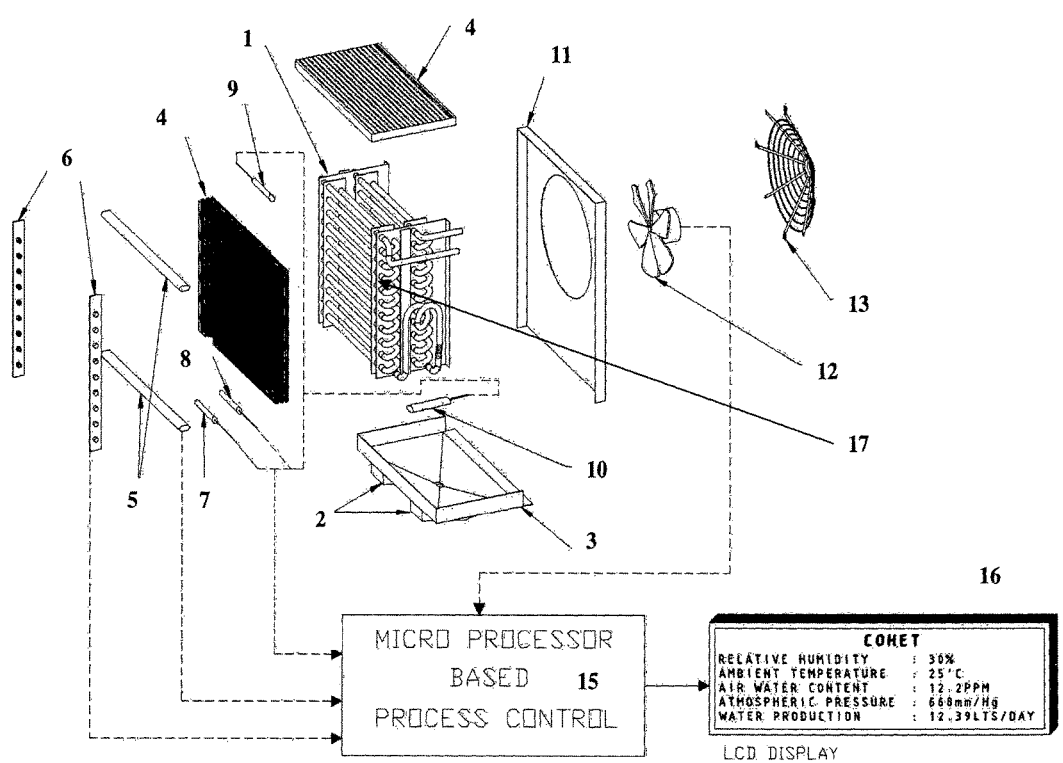
Figure 2A:
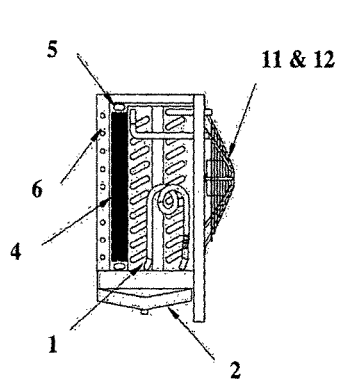
Figure 2B:
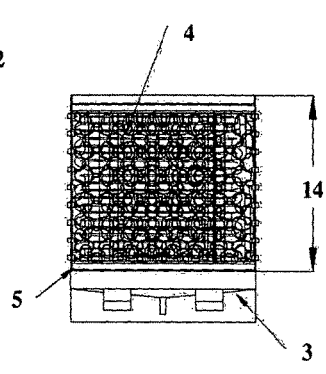
Figure 2C:
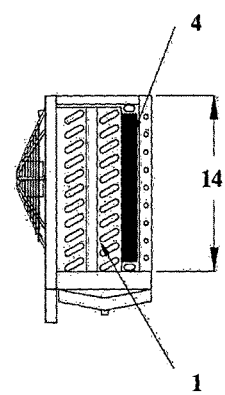
Figure 2D:
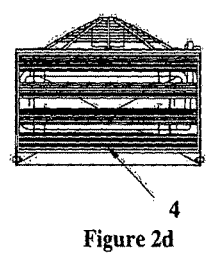

CONFINED HYPERSONIC EVAPROTRANSPIRATION CHAMBER AND A METHOD OF EXTRACTION OF WATER

BACKGROUND

Field of Invention

The present invention relates to a method of extraction of Water from the Earth's atmosphere using a novel technique of Confined Hypersonic Evaprotranspiration inside a closed chamber wherein the term Confined (meaning within or arrested), Hypersonic (meaning Very High Frequency Sound Waves), Evaprotranspiration (meaning Transpiration achieved after evaporation), and Chamber is place where all this happens.

Discussion of Prior Art

Water vapor or aqueous vapor is the gas phase of water. It is one state of water within the hydrosphere. Water vapor can be produced from the evaporation or boiling of liquid water or from the sublimation of ice. Unlike other forms of water, water vapor is invisible. Under typical atmospheric conditions, water vapor is continuously generated by evaporation and removed by condensation. It is lighter than air and triggers convection currents that can lead to clouds.

There is always water in the atmosphere. Clouds are, of course, the most visible manifestation of atmospheric water, but even clear air contains water—water in particles that are too small to be seen. One estimate of the volume of water in the atmosphere at any given time is about 12,900 cubic kilometers ($km^3$) (one cubic kilometer of water is one million liters of water, so it is 12.9 billion liters of water available continuously).

The clouds floating overhead contain water vapor and cloud droplets, which are small drops of condensed water. These droplets are way too small to fall as precipitation, but they are large enough to form visible clouds. Water is continually evaporating and condensing in the sky. If one look closely at a cloud one can see some parts disappearing (evaporating) while other parts are growing (condensation). Most of the condensed water in clouds does not fall as precipitation because their fall speed is not large enough to overcome updrafts which support the clouds.

For precipitation to happen, first tiny water droplets must condense on even tinier dust, salt, or smoke particles, which act as a nucleus. Water droplets may grow as a result of additional condensation of water vapor when the particles collide. If enough collisions occur to produce a droplet with a fall velocity which exceeds the cloud updraft speed, then it will fall out of the cloud as precipitation. This is not a trivial task since millions of cloud droplets are required to produce a single raindrop. A more efficient mechanism known as the Bergeron-Findeisen process for producing a precipitation-sized drop is through a natural process which leads to the rapid growth of ice crystals through vapor deposition, at the expense of small amount of water vapor present in a cloud. Depending on the temperature and other favorable conditions these crystals may grow and fall as snow, or melt and fall as rain.

There are many methods in the prior art for producing water from the atmosphere, but all of them use the principle of dehumidifier to condense the water by merely cooling the air. Collection of atmospheric water by dehumidification or condensation is known and existing. This technique needs a lot of energy and can be successful in a highly humid conditions.

U.S. Pat. No. 1,931,347A, titled "Apparatus for preparing potable water" describes an apparatus and a process for the preparation of potable water through a freezing procedure wherein a gaseous refrigerant is compressed by using two condensers for receiving the compressed gaseous refrigerant and liquefies the same. It also comprises an evaporator connected to one of said condensers to provide a chilling surface to form pure ice. The apparatus further excludes impurities, through the employment of a refrigerant medium circulating through a condensing and evaporating phase, and the employment of the heat yielded by the refrigerant medium in the condensing phase for the remelting of the frozen water.

U.S. Pat. No. 2,409,624A, titled "Apparatus for extracting water from atmospheric air" describes an apparatus for extracting water from atmospheric air which provides means for obtaining water, for drinking or other purpose, directly from atmospheric air, and also provide means for reducing the moisture content of air drawn from the atmosphere. The apparatus comprises a tank for containing Water, a plurality of air flow passages extending through said tank with walls of heat-conducting material and means for vaporizing part of the water in said tank to cool the remaining Water in said tank. It also has means for forcing air from the surrounding atmosphere through said air passages and for collecting the water which is condensed from the cool flowing air.

U.S. Pat. No. 3,675,442A, titled "Atmospheric water collector" describes an apparatus with a fresh water cooling bath for obtaining potable water from moisture-laden air. It comprises of vertically aligned condenser filaments which are positioned within the housing and connected to the conduit means to provide condensing surfaces at a temperature below the dew point of the air in the housing. Further the distributing means of the apparatus are provided for either directing the condensed water, depending on its temperature, to the bath, or for directing the condensed water from the apparatus as output water.

The present invention is highlighting the use of Hypersonic perspiration and creating confined extraction of water from Air, Atmosphere or any other gases.

SUMMARY OF THE INVENTION

Now, the entire process can be achieved inside a confined chamber, under a very controlled condition. Using a technology called Confined Hypersonic Evaprotranspiration (COHET), which is based on the Bergeron-Findeisen principle as explained above is exactly what is achieved in this new Invention which involves making rain in a chamber, collecting it, filtering it and drinking it—or using it for other scientific applications.

The Sun, continuously aids in evaporating water from the surface of Earth, and the air around us carries it and moves towards the sky, on the way one can capture it and guide it to a specially built chamber called Confined Hypersonic Evaprotranspiration Chamber, as proposed in current invention. The chamber first warms the air and passes it through a radiative evaporation system; here we accelerate the formation of mist or clouds, just like it happens in nature, a compression or absorption refrigeration techniques can be used to achieve radiative evaporation. The clouds or mist formed are then seeded using a unique technique called Hypersonic perspiration or HSP.

The term "Hypersonic perspiration" as used in the present specification will be used to represent a process for producing nano-water particles, smaller than 20 nanometers, which can freeze at temperatures as high as 10° C. using high frequency sound waves in the range of many million cycles per second.

A device developed by the Inventor called Hypersonic perspirator is used for the purpose of seeding by hypersonic perspiration. Hypersonic Perspiration, as stated above, is a technique that uses extremely high frequency sound waves in the range of many million cycles per second to produce Nano-Water particles, smaller than 20 nanometers. Water particles at nanometer size can freeze at temperatures as high as 10° C., that leads to rapid growth of nanometer ice crystals at the cost of very small amount of water from the cloud or fog that has formed inside a chamber, precipitation starts and raining begins inside the Confined Hypersonic Evaprotranspiration Chamber, we also call this an Active Cloud Chamber.

The rain can then be collected in a food grade tank and treated with a multistage stage filtration process and use it for drinking or straight away use it for drip irrigation in greenhouses or for other scientific purposes.

BRIEF DESCRIPTION OF ACCOMPANYING EMBODIMENTS

FIG. 1 shows the proposed confined hypersonic evapro-transpiration chamber.

FIG. 2*a* shows right side view of the confined hypersonic evaprotranspiration chamber.

FIG. 2*b* shows front view of the confined hypersonic evaprotranspiration chamber.

FIG. 2*c* shows left side view of the confined hypersonic evaprotranspiration chamber.

FIG. 2*d* shows top view of the confined hypersonic evaprotranspiration chamber.

TECHNICAL SPECIFICATION

| Confined Hypersonic Evaprotranspiration Chamber | |
|---|---|
| Product Water Production | Atmospheric vapor >10 ppm |
| Air Intake | liters per minute depending on the size of the chamber |
| Air Intake Device | Axial Turbo Air Circulator |
| Static Pressure | 22 mm $H_2O$ |
| Intake filter | PM 10/PM 2.5 |
| Intake Disinfector | Ultra Violet |
| Evaporator | Copper |
| Radiator | Aluminum |
| Refrigerant | R-134A or other depending on the size |
| Seeding perspiration | Hypersonic Perspirator |
| Drip Collector Tray | Al/SS |
| Water Tank with Sensors | Food/analytical/medical Grade Plastic/SS; 17 L |
| Control System | Real Time Computer Control. |
| Drinking Water Treatment system (DWTS) | |
| BoosterPump | DC operated DrinkingWater Grade |
| Filter No. 1 - Sediment Filter | Filters large particles; Replace every 6~12 months |
| Filter No. 2 - Pre-Carbon Filter | Removes odors, chlorine, organic compounds; Replace every 6~12 months |
| Filter No.3 - Ultra-Fine (UF) Membrane | Removes bacteria, viruses, fungus and other micro-organisms, organic, Pesticide and fertilizer residue; Replace every 18~24 months |
| Filter No. 4 - Post-Carbon Filter | Removes odors, chlorine, in-organic compounds; Replace every 12~18 months |
| Ultra Violet (UV) Sterilizer | Bacteria and virus sterilization; Replace every 24~36 months |
| Faucets | Water at Room Temperature |
| Drinking Water Quality and Standards | Meets World Health Organization (WHO), and IS 10500 :: 2012 (Test Report Attached) |

-continued

| | |
|---|---|
| Water Wasted in Process | Nil |
| Energy Requirements | |
| Power Supplies | 220 V, 50 Hz, 1 phase |
| Current for ACC | Amperes depending on the chamber size |
| Power | Depends on the size of the chamber. |
| Energy cost of product water | 0.19 kWh/L, or US$. 0.011/litre or less depending on the size of the chamber. |
| Operating Considerations | |
| Mean Cycle Life | Axial Turbo Air Circulators, 15 years; Radiative Evaporator, 20 years; Booster Pump, 15 years |
| Total Life Expectancy (whole Plant) | 15 Years |
| Environmental Conditions | Temperature 20* C. to 48* C.: Minimum Atmospheric water content should be 10 ml/1000 litres of Air (10 ppm). |
| Operating Sound Levels | ≤56 dB at distance of 3 ft (1 m) when ACC is active |

DETAILED DESCRIPTION OF ACCOMPANYING EMBODIMENTS

The Confined Hypersonic Evaprotranspiration Chamber consists of the following parts:

1. Radiative Evaporator:
   The Radiative evaporator 1 is made of a series of tubes 17 that is maintained at a specific temperature gradient between the top and the bottom. It is connected to an IR pre-heater 6 and a Hard UV source 5 at one end and an Air Suction fan 12 on the other end. The pre-heated air looses heat by radiation when it enters the chamber and is suddenly subjected to evaporation, whereby, the poly dispersed (scattered) droplets in the air, are converted to vapor. The vapor is than attracted towards the nano-ice crystals, that is formed by the hypersonic perspiration leading to the formation big and heavy water droplets that starts to rain into the drip tray. The interaction between radiation and water droplets results in the attenuation of radiative energy by scattering and absorption. The absorbed energy consequently increases droplet temperature. If the temperature is significant, the equilibrium of water vapor with a droplet will be perturbed and the droplet begins to vaporize. At the same time, the change in the droplet size further alters the radiation transfer parameters. These processes are governed by the energy and vapor transport between droplets and the environment inside the chamber.
2. Hypersonic Precipitator:
   The Precipitator 2 is a device made of a Tourmaline Crystal (is a crystalline Boron-Silicate material, compounded with Iron or Aluminum), that is placed between two stainless steel films. When this is connected in a resonance circuit, it vibrates at hypersonic frequencies. The hypersonic precipitator 2 is placed at the bottom of the drip tray, and connected to a resonating electronic circuit. Small part of the water in the drip tray is available to the hypersonic precipitator 2, to create the nanometer size water particles. These particles move up the chamber to complete the process. It takes a small part of water and converts it into water particles of the size between 15 to 20 nanometers by subjecting the water to hypersonic vibrations at extremely high frequency sound waves. The nanoscopic water particles will freeze to nano ice crystals, that grow in size by absorption of vapor in the radiative evaporator 1, producing large drops of water.

3. Drip Collector:
   The Drip Collector 3 collects the water drops falling from the cloud chamber. It is a tray made of Stainless steel material, it is not a standard material that is readily available in the market, but can be fabricated.

4. Particulate Filter:
   The Particulate Filter 4 is an air filter that filters the air from potentially harmful carcinogens. Particulate filters 4 are used in measuring pollution caused in the atmosphere by particle matter. A filter of Size 2.5 to 10 micron, is used to remove particulate matter from the Air that is drawn into the chamber.

5. UV Air disinfector:
   The UV Air Disinfector 5 is a hard ultra violet source that is used to disinfect the air drawn into the chamber. Hard Ultraviolet radiation kills all harmful' bacteria virus and spores of fungi. The Ultra Violet source here is a hard UV tube that emits high intensity UV rays used for sanitation of incoming air, it is placed before the Air Intake point.

6. Air Pre-Heater:
   The Air Pre-heater 6 is an Infrared device to pre heat the Air using infrared radiation before letting into the chamber. The air intake is an axial fan that sucks air through the chamber and throws it out.

7. Vapor Sensor:
   The Vapor Sensor 7 is a device to sense the vapor concentration in the radiative evaporator 1.

8. Inlet Air Temperature Sensor:
   Inlet Air Temperature Sensor 8 is a device to measure the Temperature of the Air after the air pre-heater 6.

9. Process Air Temperature Sensor:
   Process Air Temperature Sensor 9 is a device to measure the temperature inside the cloud chamber.

10. Atmospheric Pressure Sensor:
    Atmospheric Pressure Sensor 10 is a device that measures the atmospheric pressure around the chamber.

11. Baffle Plate:
    The Baffle plate 11 holds the radiative Evaporator 1 and the Air suction fan 12.

12. Air Suction Fan:
    The Air Suction Fan 12 sucks the right amount of air into the chamber 14.

13. Safety Guard:
    The Safety Guard 13 is a safety device that prevents entry of human hands into a rotating environment.

14. Cloud Chamber:
    The cloud chamber 14 encloses all the above sub-assemblies.

15. Microprocessor based process control:
    The Microprocessor based process control 15 is an Electronic control unit that controls all operations of the invention. For the Control function automation any type or make of microprocessor or even a micro controller is used.

16. Control Display:
    The Control Display 16 communicates with the human user by displaying all vital operational parameters. The control display 16 showcases the functional parameters like the Temperature of the atmosphere, it's relative humidity, water content of the atmosphere and total water produced by the machine at the current atmospheric conditions.

The proposed invention therefore comprises of wherein, a Radiative evaporator 1 is placed on a drip collector 3 provided with a hypersonic precipitator 2. Particulate filter 4 is placed on one side of the radiative evaporator 1, said filter has an UV air disinfector 5 placed on horizontal top and bottom sides. Air pre-heater 6 is placed on the vertical side of the filter 4. The top of the radiative evaporator 1 is closed with a second particulate filter 4 and closed with baffle plate 11 on one side thereof. The baffle plate 11 is fixed with an air suction fan 12 having a safety guard 13. A vapour sensor 7, an inlet temperature sensor 8, a process air temperature sensor 9 and an atmospheric pressure sensor 10 are placed around the particulate filter 4, on one side of the radiative evaporator 1. All the above are placed in an active cloud chamber 14. A microprocessor based process control 15 controls UV air disinfector 5, air preheater 6, sensors 7 to 10 and the air suction fan 12 and a LCD display unit 16 is provided to display all vital operational parameters.

The following is the extract of the comprehensive test report of the water produced by Confined Hypersonic Evaprotranspiration technique (without re-mineralisation). Annexure:

TEST REPORT

Table given in the specification is the test report of the water produced by the invention device.
Report/Order. No.: 201400404
Requested by: Dr. R V Kumar
Product Tested: Water
Reference: W.O No. SCL/007/2013-14 dt. 21.03.2014
Sample identification: Aquaria Water Sample
The Table provided is the test report of water produced by the device. The water is tested for various aspects like Physical and Chemical properties, heavy metals, pesticides residue etc. The relevant standards and references used for testing is mentioned in the last column of the report table.

TABLE 1

| Test Parameters | Unit | Results | Requirement (Acceptable Limit) As per | Test Method |
| --- | --- | --- | --- | --- |
| Colour | Hazen units | <5 | 5 | IS: 3025 (P-4) 1983 |
| Odour | — | Agreeable | Agreeable | IS: 3025 (P-5) 1983 |
| pH value | — | 6.7 | 6.5 | IS: 3025 (P-11) 1983 |
| Taste | — | Agreeable | Agreeable | IS: 3025 (P-7 & 8) 1984 |
| Turbidity | NTU | BDL of 1 | 1 | IS: 3025 (P-10) 1984 |
| Total dissolved solids | mg/l | 78 | 500 max | IS: 3025 (P-16) 1984 |
| Aluminium (as Al) | mg/l | BDL of 0.03 | 0.03 max | IS: 3025 (P-2) 2004 |

TABLE 1-continued

| Test Parameters | Unit | Results | Requirement (Acceptable Limit) As per | Test Method |
|---|---|---|---|---|
| Ammonia (as total ammonia- | mg/l | BDL of 0.5 | 0.5 max | IS: 3025 (P-34) 1988 |
| Anionic detergents (as MBAS) | mg/l | BDL of 0.1 | 0.2 max | Annex K of IS 13428 |
| Barium (as Ba) | mg/l | BDL of 0.05 | 0.7 max | IS: 3025 (P-2) 2004 |
| Boron (as B) | mg/l | BDL of 0.1 | 0.5 max | IS: 3025 (P-2) 2004 |
| Calcium (as Ca) | mg/l | 3.7 | 75 | IS: 3025 (P-2) 2004 |
| Chloride (as Cl) | mg/l | 25 | 250 max | IS: 3025 (P-32) 1988 |
| Copper (as Cu) | mg/l | BDL of 0.05 | 0.05 max | IS: 3025 (P-2) 2004 |
| Fluoride (as F) | mg/l | BDL of 0.1 | 1 | IS: 3025 (P-60) 2008 |
| Free residual chlorine | mg/l | BDL of 0.1 | 0.2 | IS: 3025 (P-26) 1986 |
| Iron (as Fe) | mg/l | BDL of 0.05 | 0.3 max | IS: 3025 (P-2) 2004 |
| Magnesium (as Mg) | mg/l | BDL of 1 | 30 | IS: 3025 (P-2) 2004 |
| Manganese (as Mn) | mg/l | BDL of 0.05 | 0.1 max | IS: 3025 (P-2) 2004 |
| Mineral oil | mg/l | BDL of 0.5 | 0.5 max | IS: 3025 (P-39) 199 Infrared partition method |
| Nitrate (as NO3) | mg/l | 1 | 45 | IS: 3025 (P-34) 1988 |
| Phenolic compounds (as C6H5OH) | mg/l | BDL of 0.001 | 0.001 max | IS: 3025 (P-43) 1992 |
| Selenium (as Se) | mg/l | BDL of 0.01 | 0.01 max | IS: 3025 (P-2) 2004 |
| Silver (as Ag) | mg/l | BDL of 0.05 | 0.1 max | IS: 3025 (P-2) 2004 |
| Sulphate (as SO4) | mg/l | 4 | 200 max | IS: 3025 (P-24) |
| Sulphide (as H2S) | mg/l | BDL of 0.05 | 0.05 max | IS: 3025 (P-29) |
| Total alkalinity as calcium carbonate | mg/l | 16 | 2.00 max | IS: 3075 (P-23) |
| Total hardness (as CaCO3) | mg/l | 13 | 200 max | IS: 3025 (P-21) |
| Zinc (as Zn) | mg/l | BDL of 0.05 | 5 | IS: 3025 (P-2) 2004 |
| Cadmium (as Cd) | mg/l | BDL of 0.003 | 0.003 max | EPA 200.8 |
| Cyanide (as CN) | mg/l | BDL of 0.05 | 0.05 max | IS: 3025 (P-27) |
| Lead (as Pb) | mg/l | BDL of 0.01 | 0.01 max | IS: 3025 (P-2) 2004 |
| Mercury (as Hg) | mg/l | BDL of 0.001 | 0.001 max | EPA 200.8 |
| Molybdenum (as Mo) | mg/l | BDL of 0.05 | 0.07 max | IS: 3025 (P-2) 2004 |
| Nickel (as Ni) | mg/l | BDL of 0.01 | 0.02 max | IS: 3025 (P-2) 2004 |
| Polychlorinated biphenyls mg/l | mg/l | BDL of 0.0005 | 0.0005 max | APHA 22 and Edition (P-6630C) 2 |
| Polynuclear aromatic hydrocarbons (as PAH) | mg/l | BDL of 0.0001 | 0.0001 max | APHA 22 and Edition (P-6630C) 2 |
| Total arsenic (as As) | mg/l | BDL of 0.01 | 0.01 max | IS: 3025 (P-2) 2004 |
| Total chromium (as Cr) | mg/l | BDL of 0.05 | 0.05 max | IS: 3025 (P-2) 2004 |
| Trihalomethanes: | | | | |
| a) Bromoform | mg/l | BDL of 0.05 | 0.1 max | APHA |
| b) Dibromochloromethane | mg/l | BDL of 0.05 | 0.1 max | |
| c) Bromodichloromethane | mg/l | BDL of 0.05 | 0.06 max | |
| d) Chloroform | mg/l | BDL of 0.05 | 0.2 max | |
| Residual Pesticides | | | | |
| Atrazine | µg/l | BDL of 0.1 | 2 | UsEPA-525.2/LCMS |
| Aldrin | µg/l | BDL of 0.03 | 0.03 max | USEPA 508 |
| Dieldrin | µg/l | BDL of 0.03 | 0.03 max | USEPA 508 |
| Gamma-HCH (Lindane) | µg/l | BDL of 0.1 | 2 | USEPA 508 |
| Phorate | µg/l | BDL of 0.1 | 2 | USEPA-8141A/LCMS |
| Alachlor | µg/l | BDL of 0.1 | 20 | UsEPA-525.2/LCMS |
| Alpha HCH | µg/l | BDL of 0.01 | 0.01 max | USEPA 508 |
| Chlorpyrifos | µg/l | BDL of 0.1 | 30 | USEPA 525.2 |
| Delta HCH | µg/l | BDL of 0.04 | 0.04 max | USEPA 508 |
| DDT (op & pp - Isomers of DDT. DDE) | µg/l | BDL of 0.1 | 1 | USEPA 508 |
| Endosulfan (A and B) | µg/l | BDL of 0.1 | 0.4 max | USEPA 508 |
| Methyl Parathion | µg/l | BDL of 0.1 | 0.3 max | USEPA-8141A/LCMS |
| Monocrotophos | µg/l | BDL of 0.1 | 1 | USEPA-8141A/LCMS |
| 2,4-Dichlorophenoxyacetic | µg/l | BDL of 0.1 | 30 | USEPA-515.1/LCMS |
| Isoproturon | µg/l | BDL of 0.1 | 9 | USEPA-532/LCMS |
| Beta HCH | µg/l | BDL of 0.04 | 0.04 max | USEPA 508 |
| Butachlor | µg/l | BDL of 0.1 | 125 max | USEPA-525.2/LCMS |
| Ethion | µg/l | BDL of 0.1 | 3 | USEPA-8141AILCMS |
| Malathion | µg/l | BDL of 0.1 | 190 max | USEPA-8141A/LCMS |
| Microbiology | | | | |
| Total coliform | MPN/100 ml | Not detected | Shall not be detectable | IS: 1622-2003 |
| E.coli | MPN/100 ml | Not detected | Shall not be detectable | IS: 1622-2003 |

*BDL - Below Detection Limit
Remarks: The above Tested parameters meets the requirements as per IS 10500: 2012

The invention claimed is:

1. A Confined Hypersonic Evaprotranspiration Chamber for extraction of water from the Earth's atmosphere, air or any other gas, using a novel technique of Confined Hypersonic Evaprotranspiration based on the Bergeron-Findeisen principle, comprising of:
   a radiative evaporator (1), a hypersonic precipitator (2), a drip collector (3), a particulate filter (4), an UV air disinfector (5), an air pre-heater (6), a vapor sensor (7), an inlet temperature sensor (8), a process air temperature sensor (9), an atmospheric pressure sensor (10), a baffle plate (11), an air suction fan (12), a safety guard (13), an active cloud chamber (14), a microprocessor based process control (15), and a Control display unit (16) wherein:
   the radiative evaporator (1) is placed on the drip collector (3) provided with a hypersonic precipitator (2);
   the particulate filter (4) is placed on one side of the radiative evaporator (1) having the UV air disinfector (5) placed on horizontal top and bottom sides;
   the pre-heater (6) is placed on the vertical side of the particulate filter (4);
   one or more sensors of the vapor sensor (7), the inlet temperature sensor (8), the process air temperature sensor (9) and the atmospheric pressure sensor (10) are placed around the particulate filter (4), on one side of the radiative evaporator (1);
   the baffle plate (11) is fixed with an air suction fan (12) having a safety guard (13);
   the cloud chamber (14) encloses all the above sub-assemblies;
   the microprocessor based process control (15) is an Electronic control unit that controls UV air disinfector (5), air pre-heater (6), sensors (7), (8), (9), (10), the air suction fan (12) and all operations; and
   the LCD Control display unit (16) is provided to display operational parameters.

2. The Confined Hypersonic Evaprotranspiration Chamber as claimed in claim 1, wherein the Radiative evaporator (1) is made of a series of tubes (17) through which heat exchange takes place and which are always maintained at a specific temperature gradient between the top and the bottom and is connected to the IR pre-heater (6) and hard UV source (5) at one end and the air suction fan (12) on the other end.

3. The Confined Hypersonic Evaprotranspiration Chamber as claimed in claim 1, wherein the Hypersonic Precipitator (2) is made of a ceramic material that is placed between two stainless steel films and fitted at the bottom of the drip tray (3) and carries out hypersonic precipitation when connected in a resonance circuit by vibrating at hypersonic frequency sound waves in the range of many million cycles per second to produce nano-water particles, smaller than 20 nanometers.

4. The Confined Hypersonic Evaprotranspiration Chamber as claimed in claim 1, wherein the Drip Collector (3) collects the water drops falling from the cloud chamber (14).

5. The Confined Hypersonic Evaprotranspiration Chamber as claimed in claim 1, wherein the particulate filter (4) has a filter size of 10 micron and/or 2.5 micron to filter the air from potentially harmful carcinogens, measure pollution caused in the atmosphere by particle matter and remove particulate matter from the air that is drawn into the chamber.

6. The Confined Hypersonic Evaprotranspiration Chamber as claimed in claim 1, wherein the UV Air Disinfector (5) disinfects the air drawn into the chamber with the hard ultraviolet radiation drawn in with an ultra violet source of hard UV tube to emit high intensity UV rays.

7. The Confined Hypersonic Evaprotranspiration Chamber as claimed in claim 1, wherein the air preheater (6) pre heats the air using infrared radiation before letting into the chamber.

8. The Confined Hypersonic Evaprotranspiration Chamber as claimed in claim 1, wherein one or more of the sensors used comprises of: the vapor sensor (7) to sense the vapor concentration in the radiative evaporator (1), the inlet air temperature sensor (8) to measure the temperature of the air after the air pre-heater (6), the process air temperature sensor (9) to measure the temperature inside the cloud chamber, and the atmospheric pressure sensor (10) to measure the atmospheric pressure around the chamber.

9. A method of extraction of water from the Earth's atmosphere, air or any other gas using a novel technique of Confined Hypersonic Evaprotranspiration based on the Bergeron-Findeisen principle, under a controlled condition by making rain in a chamber as claimed in claim 1, comprising the steps of:
   warming the air and passing it through a radiative evaporation system where the formation of mist or clouds is accelerated in the chamber;
   converting the poly dispersed droplets in the air to vapor by radiative evaporation carried out by the radiative evaporator (1) by:
      letting interaction between radiation and water droplets to result in the attenuation of radiative energy by scattering and absorption,
      increasing the droplet temperature by the absorbed energy such that if the temperature is significant, the equilibrium of water vapor with a droplet perturbs and the droplet vaporizes, and
      altering the radiation transfer parameters due to the change in the droplet size in the chamber;
   producing nanometer water particles of the size between 15 to 20 nanometers by the hypersonic precipitator (2) by subjecting the water to hypersonic vibrations at extremely high frequency sound waves;
   moving the nanometer particles up the chamber and freezing to nano ice crystals that grow in size by absorption of vapor in the radiative evaporator (1), producing large drops of water;
   forming of the cloud or fog that has formed inside a chamber such that precipitation starts and results raining inside the Confined Hypersonic Evaprotranspiration Chamber; and
   collecting the rain in a food grade tank and treating with a multistage stage filtration process to be used for one or more purposes.

10. The method as claimed in claim 9 wherein the water particles at nanometer size freezes at temperatures as high as 10° C., that leads to rapid growth of nanometer ice crystals at the cost of very small amount of water from the cloud or fog that has formed inside a chamber such that precipitation starts and results in rain inside the Confined Hypersonic Evaprotranspiration Chamber.

* * * * *